United States Patent [19]

Kelly

[11] 4,306,579

[45] Dec. 22, 1981

[54] MULTI-TANK FUEL CONTROL SYSTEM

[76] Inventor: Michael J. Kelly, 6401 Warner Ave., #534, Huntington Beach, Calif. 92647

[21] Appl. No.: 133,736

[22] Filed: Mar. 24, 1980

Related U.S. Application Data

[63] Continuation of Ser. No. 925,208, Jul. 17, 1978, abandoned.

[51] Int. Cl.³ .............................................. F02B 77/00
[52] U.S. Cl. ........................................ 137/1; 137/263; 137/558
[58] Field of Search ........................ 137/113, 263, 558

[56] References Cited

U.S. PATENT DOCUMENTS

| | | | |
|---|---|---|---|
| 2,121,664 | 6/1938 | Huckins | 137/558 |
| 2,549,409 | 4/1951 | Atkinson | 137/263 X |
| 3,771,542 | 11/1973 | Williams | 137/113 X |
| 3,805,821 | 4/1974 | Bitner | 137/263 X |

Primary Examiner—Alan Cohan
Attorney, Agent, or Firm—William W. Glenny

[57] ABSTRACT

A fuel control system is disclosed for supplying fuel to an engine from a plurality of fuel tanks in a manner which provides an operator with sufficient warning when a selected fuel tank has run dry prior to ceasing fuel flow to the engine that action can be taken to switch to an alternate fuel tank whereby engine operation is never ceased under normal circumstances. The disclosed apparatus includes a novel buffer container for disposition between the selector valve and engine incorporating a bi-stable sensor and an outlet fitting for metering trapped air into the fuel to the engine whereby venting to atmosphere is not required.

5 Claims, 6 Drawing Figures

MULTI-TANK FUEL CONTROL SYSTEM

This is a continuation of application Ser. No. 925,208, filed July 17, 1978, now abandoned.

BACKGROUND OF THE INVENTION

The present invention relates to fuel supply systems and more particularly to multi-fuel tank systems incorporating a selector valve such as employed in airplanes and the like.

There are many instances where a liquid fuel operated engine is supplied fuel from a plurality of tanks on a selective basis by means of a selector valve interconnecting the fuel line to the engine to the selected liquid fuel tank. Sometimes, this takes place where one or more additional tanks have been added to a basic vehicle such as with recreational vehicles or the like wherein the touring range of the original fuel tank supplied with the vehicle is inadequate for desired operation.

A principal use of such apparatus is in aircraft wherein a plurality of fuel tanks are incorporated on a space-available basis within various points of the wings and/or fuselage. Such an arrangement is shown in FIG. 1. For example, one fuel tank 10 is located within the left wing and a second fuel tank 12 is located within the right wing. The output lines 14 and 16, respectively, from the tanks 10, 12 are connected as inputs to selectable positions of a selector valve 18. The output of selector valve 18 is connected through fuel line 20 to the engine (not shown). By turning the selector valve 18 to connect the left fuel tank 10, fuel flows only from left tank 10, through selector valve 18 to fuel line 20 and thence to the engine. Typically, the two fuel tanks 10, 12 are provided with fuel gauges. These gauges, however, are only an approximation and, typically, the pilot is suddenly faced with a "dead" engine when running his tanks to a completely empty condition. The selector valve 18 is then moved to the opposite tank whereupon the engine must be restarted in flight. A similar situation exists in land vehicles such as recreational vehicles as previously described. In either case, the stoppage of the engine is, normally, not disastrous. That is, it can be restarted once again. Often, however, the engine stoppage is at a time of inconvenience. For passengers, sudden stoppage of the engine in an airplane can be a frightening experience. With fuel-injected engines, the engine restart procedure can sometimes be more difficult giving even the pilot who anticipated an engine stoppage a moment of concern until the engine, in fact, restarts.

Wherefore, it is the object of the present invention to provide a method and apparatus for operation of multi-tank selectable fuel systems for supplying liquid fuel to an engine whereby individual tanks can be completely emptied but wherein sufficient operating time is supplied to the engine from a temporary source to maintain the engine in operation during the period of changeover to the next major fuel supply.

SUMMARY

The foregoing objective has been met in a liquid fuel system having a plurality of fuel tanks and a selector valve having a plurality of inputs connected to the fuel tanks and an output connected to supply fuel to an engine whereby individual fuel tanks can be selected to supply fuel to the engine, by the improvement comprising a buffer container disposed between the output of the selector valve and the engine for holding sufficient fuel to run the engine for the time between the supply fuel tank becoming empty and an operator switching the selector valve to another tank; sensor means connected to the buffer container for generating a signal when the fuel volume within the buffer container decreases to less than a preselected value; and, alarm means connected to the sensor means for signaling an operator to switch fuel tanks in response to the aforesaid signal indicating that the buffer container is no longer being supplied fuel from the main supply fuel tank and that the engine is now running on the reserve buffer of fuel.

In the preferred embodiment shown, the alarm means comprises an audible alarm initiated by the signal; means for an operator to turn off the audible alarm only for the duration of a signal from the sensor means; and, a visual alarm initiated by the signal, the visual alarm remaining "on" for the duration of a signal whereby the visual alarm is "off" only when the fuel volume within the buffer container is greater than the preselected value thus indicating that the newly switched-to fuel supply tank is now supplying fuel and the engine is not continuing to run merely on the buffer supply in the container.

Particularly for aircraft operation, the buffer container is closed having no venting to atmosphere and includes means for metering air trapped therein as the buffer container is filled with fuel into the fuel to the engine in a quantity insufficient to fuel-starve the engine.

DESCRIPTION OF THE PREFERRED EMBODIMENT

The present apparatus was primarily designed for use in aircraft and, accordingly, the description which follows hereinafter is primarily directed to that use. It is to be understood, however, that the method and apparatus would be similar for any similar operation with the exception of the non-venting features employed in the preferred embodiment necessary for aircraft use. That is, it is undesirable in aircraft for the possibility to exist of fuel vapors entering the engine compartment. This is particularly true where aerobatics may be employed wherein the aircraft can be in various inverted positions.

Figure 1:
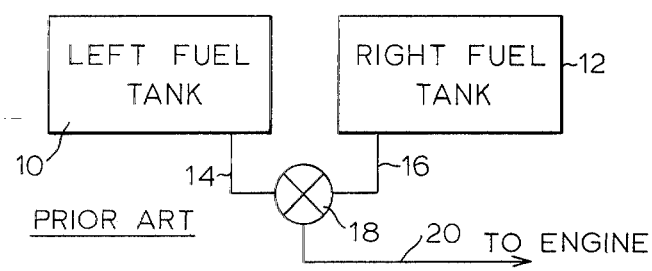
FIG. 1 is a block diagram of the prior art method of connecting multi-fuel tanks through a selector valve to supply an engine with liquid fuel.
Figure 2:
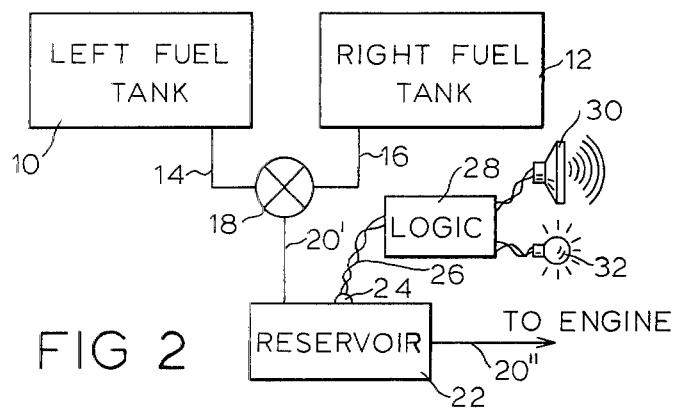
FIG. 2 is a block diagram of the apparatus of the present invention as employed to supply fuel from a multi-tank supply through the sensing and alarming buffer reservoir system prior to the engine.

Referring now to FIG. 2, the fuel system of the present invention is shown in block diagram form. As can be seen, the fuel tanks 10 and 12 along with the output lines 14 and 16 and the selector valve 18 remain the same. The modification occurs within the output line 20 wherein a reservoir of emergency fuel is disposed within the fuel line 20 to the engine. That is, the portion 20' from the selector valve 18 is connected as an input to the reservoir 22 and the portion 20" supplying fuel to the engine is connected to the output of reservoir 22. Reservoir 22 includes a sensor 24 connected by electrical leads 26 to a logic circuit 28. Logic circuit 28 is connected to drive an audible alarm such as the horn or beeper 30 and a visible light 32. As can be understood, when, for example, selector valve 18 is connected to draw fuel from the left fuel tank 10, reservoir 22 will be maintained in a full condition. When left fuel tank 10 runs dry, however, the fuel being supplied to the engine through line 20" will not be replaced through line 20' wherefore the fuel in the reservoir 22 will begin to be consumed and not be replaced. By making sensor 24 responsive to this change in volume condition, logic 28 can be made to alert the operator as with the horn 30 and light 32 so that the changeover of selector valve 18 to right fuel tank 12 can be accomplished while the engine continues to run from the quantity of fuel within the reservoir 22.

Figure 3:
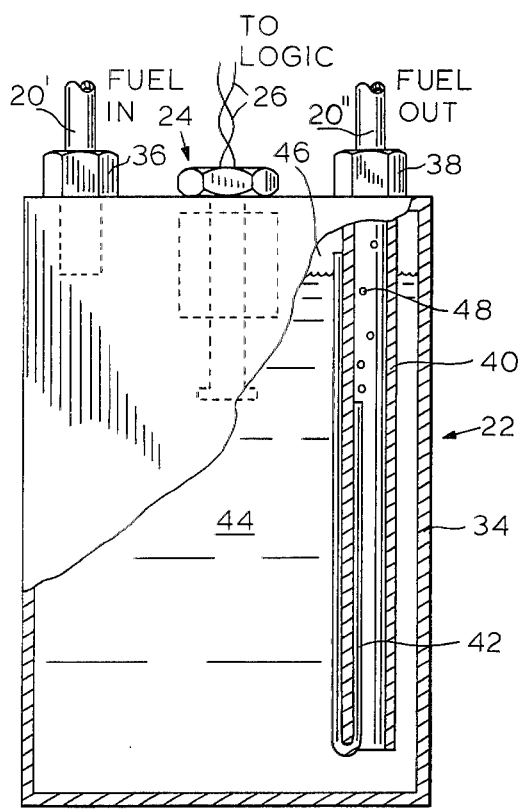
FIG. 3 is a partially cut-away elevation through the buffer container employed to practice the method of the present invention.

Referring now to FIG. 3, the reservoir 22 is shown in greater detail as comprising a buffer container 34 capable of holding only sufficient fuel to operate the engine for a period of time to allow corrective action to be taken. In a tested embodiment, buffer container 34 is of 40 cubic inch volume which provides 15–45 seconds of engine operation depending on the engine being supplied (i.e. the fuel consumption rate of the engine). For other applications such as recreational vehicles, it may be desired to make buffer container as large as one gallon or so, so as to provide ample time to find an additional supply of fuel in an emergency situation.

Buffer container 34 has an input fitting 36 adapted for connection to the input fuel line 20' and an output fitting 38 adapted for connection to the fuel output line 20". In typical fashion, output fitting 38 includes a tube 40 extending to closely adjacent the bottom of container 34 whereby fuel can be drawn from the container 34 to an almost empty condition. To provide the non-vented features desired for aircraft use, a capillary-type tube 42 is disposed as shown in FIG. 3 extending from adjacent the top of the interior of buffer container 34 on one end to within the fuel tube 40 on the opposite end. Thus, as fuel 44 enters container 34 through input fitting 36, air 46 trapped in the top of the container can flow through capillary tube 42 to be entrained as bubbles 48 within the fuel 44 exiting to the engine through output fitting 38. When so constructed, it is important that capillary tube 42 be sized so as to meter the air 46 in a quantity insufficient to fuel-starve the engine (not shown). That is, if capillary tube 42 were made large enough, bubbles 48 would completely fill line 20" acting in the manner of a vapor lock to block fuel to the engine. This is particularly true where the fuel pump is disposed within line 20" where it can draw from an air bubble as opposed to the condition where the fuel pump is disposed within line 20' so as to draw from a fuel-only source and force any bubbles of air 48 ahead to the engine. The latter case is, of course, preferred and can only result in a temporary lean condition of the fuel mixture to the engine if capillary tube 42 is sized to produce bubbles 48 in a quantity insufficient to fuel-starve the engine as previously mentioned.

Figure 4:
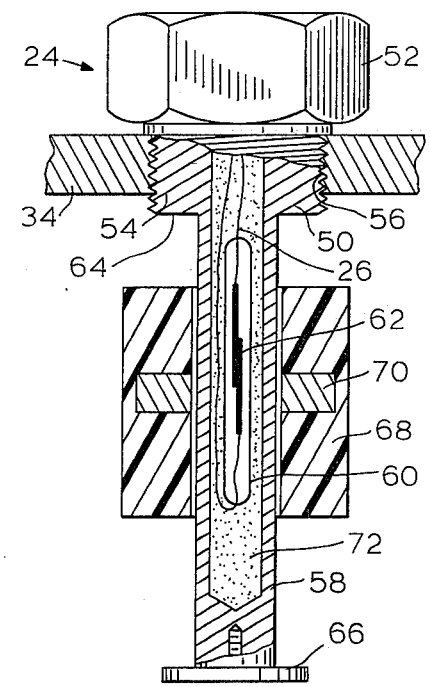
FIG. 4 is a detailed cut-away view of the sensor employed within the buffer container of FIG. 3.

The sensor, indicated generally as 24, is shown in greater detail in FIG. 4. Sensor 24 comprises a body 50 of a non-magnetic material. In the preferred and tested embodiment, body 50 is of stainless steel. Body 50 has a hexagon-shaped head 52 adapted for gripping by a wrench, or the like. The bottom of head 52 is a threaded portion 54 adapted for threaded engagement in hole 56 in the top of container 34. The bottom 58 of sensor 24 is cylindrical in shape having a hollow portion in the center thereof wherein an encapsulated reed switch 60 is disposed. Reed switch 60 is of the dry nitrogen-filled type having a pair of contacts 62 therein connected to external leads 26. Bottom portion 58 is cylindrical in shape and smaller in diameter than threaded portion 54 whereby a stop ridge 64 is provided at the top of bottom portion 58. A stop plate 66 is threadedly engaged on the bottom end of bottom portion 58. A cylindrical float 68 is slidably engaged about bottom portion 58. When positioned vertically in container 34 as shown, the float 68 is adapted to rise with the level of the fuel 44 to a position against stop ridge 64. As the fuel volume within container 34 falls, float 68 descends until it rests upon stop plate 66. A magnet 70 is disposed within float 68 to operate the contacts 62 of reed switch 60. When the container 34 contains a full volume of fuel 44, float 68 is adapted to position magnet 70 so as to maintain contacts 62 in one position. As the fuel descends to a preselected volume, float 68 is adapted to position magnet 70 to reverse the position of contacts 62 and thereafter maintain contacts 62 in said position as long as the volume of fuel 44 within container 34 is less than the preselected amount determined by the point at which float 68 causes magnet 70 to change the status of contacts 62. To maintain reed switch 60 in its proper location within body 50, it is preferred that the hollow center of bottom portion 58 of body 50 be filled with an appropriate potting compound 72.

Figure 5:
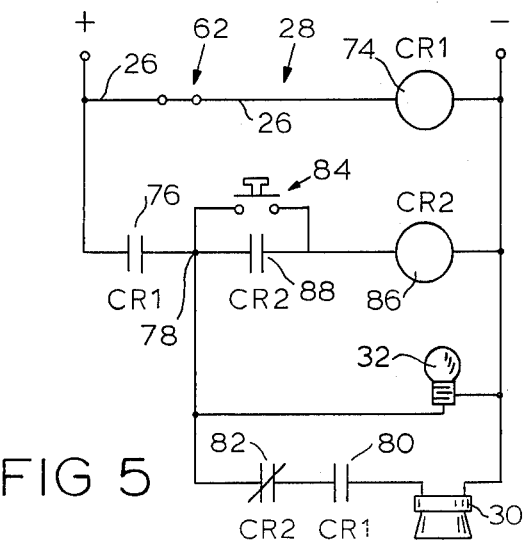
FIG. 5 is a circuit which can be employed to provide the desired alarming action in the preferred embodiment of the present invention.

Referring now to FIG. 5, one circuit which can be employed to implement the preferred method of operation of the present invention is shown. It is to be understood that while the circuit shown employs relays, solid state circuitry could also be employed. Various methods of implementing the methodology described herein are well know to those skilled in the art and, per se, form no part of the present invention. As can be seen, the circuit generally indicated as 28 in FIG. 5 is powered by a DC electrical source. This would normally be the battery supply of the aircraft or vehicle wherein the fuel supply system of the present invention is being employed. As can be seen, contacts 62 of reed switch 60 are of the normally closed variety. Thus, with float 68 positioned against stop plate 66, contacts 62 would be closed connecting the coil of relay CR1 74 across the supply voltage through the leads 26. As float 68 rises with increased volume of fuel 44 within container 34, contacts 62 are opened. Assuming that the selector valve 18 is connected to a full tank of fuel, contacts 62 would be opened and, therefore, relay CR1 74 would be inactive. Thus, normally opened contacts 76 of CR1 would be opened. Upon the fuel tank running dry, float 68 will descend towards stop plate 66 as fuel 44 is consumed from container 34 and not replaced. At the preselected point, contacts 62 will close as shown in FIG. 5 when no longer maintained open by magnet 70. Upon this occurrence, relay CR1 74 is activated causing contacts 76 to close providing power to point 78. With power at point 78, light 32 is connected to power and, therefore, illuminates. Simultaneously, horn 30 (or buzzer, beeper, or the like) is connected to power through the now closed contacts 80 of CR1 and through the normally closed contacts 82 of relay CR2 which is, as yet, unactivated. Thus, as the fuel tank supplying fuel to the engine runs dry, the operator is alerted by both an audible signal from the horn 30 and an illuminated signal from the light 32 that the engine is now running on the reservoir of fuel 44 within the buffer container 34. To silence the audible alarm from horn 30, an acknowledge button 84 is provided which, when depressed, connects point 78 to relay CR2 86. Upon activation, relay CR2 86 becomes self-holding through its own normally opened contacts 88 connecting it to point 78. Thus, it can be seen that the horn 30 will be silenced by the opening of normally closed contacts 82 of relay CR2 86 while the light 32 remains illuminated by contacts 76 as long as reed switch contacts 62 remain in their normally closed position. When the selector valve 18 is changed in position to provide fuel from a new tank, the light 32 will be extinguished when float 68 rises to a point past the preselected minimum volume of fuel 44 within container 34. Thus, the operator is guaranteed that a fresh supply of fuel has been connected by the extinguishing of light 32. Simultaneously, of course, the reserve capacity is automatically once again established in contrast to other reserve systems wherein manual activation of a reserve system can be forgotten whereby the reserve system is unavailable when next needed. Failure of the light 32 to extinguish practically instantaneously (with a small volume such as previously described) immediately indicates that the selected tank is either empty or, for some other reason, not supplying fuel. This permits the operator to take further corrective action while the engine remains operative from the fuel within the buffer container 34.

Figure 6:
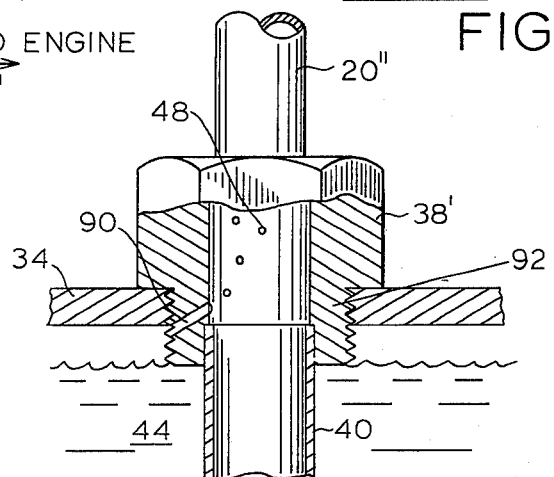
FIG. 6 is a cut-away view through an alternate embodiment of the outlet fitting employed in the buffer container of FIG. 3 to allow complete filling of the buffer container without the necessity for a vent line to atmosphere.

Referring now to FIG. 6, an alternate embodiment for the output fitting 38' is shown. In this embodiment, the external capillary tube 42 of the embodiment of FIG. 3 is replaced by a capillary passage 90 disposed through the head portion 92 from a point within the container 34 adjacent the top thereof when head portion 92 is threadedly engaged with the top of container 34 as shown on one end to within the interior conduit of head portion 92 connecting fuel tube 40 to fuel line 20". In all other regards, the capillary passage 90 operates in substantially identical manner to the capillary tube 42 and should be sized according to the discussion attendant thereto.

Thus, it can be seen that the method and apparatus of the present invention has achieved its desired objectives by supplying fuel to an engine from a multitank supply in a manner which provides the operator with warning that a tank has expended its fuel while maintaining the engine in operation for a period of time to allow the transfer to an auxiliary supply of fuel.

It should be readily apparent that by employing the sensing buffer reservoir of the present invention with a power-driven solenoid valve and appropriate additional driving logic responsive to the signal from the sensor, an automated multi-tank fuel system could be provided wherein as each fuel tank ran dry the system would sequence to the next fuel tank automatically.

Wherefore, having thus described my invention, I claim:

1. In a liquid fuel system having a plurality of fuel tanks and a selector valve having a plurality of inputs connected to the fuel tanks and an output connected to supply fuel to an engine whereby individual fuel tanks can be selected to supply fuel to the engine, the improvement for preventing the engine from running out of fuel comprising:
    (a) a buffer container disposed between the output of the selector valve and the engine for holding sufficient fuel to run the engine for the time between the supply fuel tank becoming empty and an operator switching the selector valve to another tank;
    (b) sensor means connected to said buffer container for generating a signal when the fuel volume within said buffer container decreases less than a preselected value; and,
    (c) alarm means connected to said sensor means for signaling an operator to switch fuel tanks in response to said signal,
said buffer container including means for metering air trapped therein into the fuel to the engine in a quantity insufficient to fuel-starve the engine whereby said container can be filled with fuel without the necessity of a vent from inside said buffer container to atmosphere.

2. The improvement to liquid fuel systems of claim 1 wherein said alarm means comprises:
    (a) an audible alarm initiated by said signal;
    (b) means for an operator to turn off said audible alarm only for the duration of a said signal; and,
    (c) a visual alarm initiated by said signal, said visual alarm remaining "on" for the duration of a said signal whereby said visual alarm is "off" only when the fuel volume within said buffer container is greater than said preselected value.

3. The method of supplying liquid fuel to an engine from a pluarlity of fuel tanks so as to prevent engine stoppage from lack of fuel while completely emptying the fuel tanks comprising the steps of:
    (a) connecting the outlets of the fuel tanks to respective inputs of a multi-position selector valve;
    (b) connecting the outlet of the selector valve to the input of a buffer container;
    (c) connecting the output of the buffer container as the fuel input line to the engine;
    (d) running the engine with the fuel from a selected one of the fuel tanks;
    (e) sensing the volume of fuel in said buffer container;
    (f) indicating a fuel tank empty condition when the volume of fuel in said buffer container falls below a preselected amount;
    (g) switching to another of the fuel tanks containing a quantity of fuel while the engine continues to operate from the fuel in said buffer container;
    (h) metering air trapped in said buffer container into the fuel flowing to the engine as said buffer container fills from the newly selected fuel tank at a rate insufficient to cause fuel starvation of the engine,
    (i) verifying that the volume of fuel in said buffer container has increased above said preselected amount whereby the presence of fuel flowing from the newly selected fuel tank indicated and going to step (g) if it has not; and,
    (j) repeating steps (e) through (i).

4. In a liquid fuel system for an engine, said system having a plurality of fuel tanks and a selector valve provided with a plurality of inputs, one connected to each tank, and with an output, the valve being actuable to connect a selected input into fluid communication with the output, the provision of:

a buffer container having an inlet for receiving liquid fuel from the output of the selector valve and an outlet for supplying fuel to the engine;

means for metering gas trapped within the container into the fuel supplied to the engine through said outlet in a quantity insufficient to fuel-starve the engine;

sensor means for generating a signal when the fuel in the container falls below a predetermined level; and means responsive to the existence of said signal for producing an alarm.

5. The invention as defined in claim 4 wherein said metering means comprises a capillary tube extending between the upper portion of said container and said outlet.

* * * * *